United States Patent
Turney

(10) Patent No.: US 11,773,780 B2
(45) Date of Patent: *Oct. 3, 2023

(54) INTERCOOLED COOLING AIR WITH SELECTIVE PRESSURE DUMP

(71) Applicant: Raytheon Technologies Corporation, Farmington, CT (US)

(72) Inventor: Joseph Turney, Amston, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,050

(22) Filed: Jan. 28, 2022

(65) Prior Publication Data
US 2022/0154645 A1 May 19, 2022

Related U.S. Application Data

(63) Continuation of application No. 16/050,409, filed on Jul. 31, 2018, now Pat. No. 11,255,268.

(51) Int. Cl.
*F02C 7/18* (2006.01)
*F02C 9/18* (2006.01)
(Continued)

(52) U.S. Cl.
CPC ............. *F02C 7/185* (2013.01); *F02C 7/32* (2013.01); *F02C 9/18* (2013.01); *F02K 3/06* (2013.01);
(Continued)

(58) Field of Classification Search
CPC ........... F05D 2220/32; F05D 2260/213; F05D 2270/101; F02C 6/08; F02C 7/185;
(Continued)

(56) References Cited

U.S. PATENT DOCUMENTS 2,692,476 A 10/1954 Schaal et al.
3,878,677 A 4/1975 Colvin
(Continued)

FOREIGN PATENT DOCUMENTS

DE 2852057 6/1979
EP 0447886 9/1991
(Continued)

OTHER PUBLICATIONS

European Search Report for EP Application No. 19189477.3 dated Dec. 20, 2019.
(Continued)

*Primary Examiner* — Todd E Manahan
*Assistant Examiner* — Sean V Meiller
(74) *Attorney, Agent, or Firm* — Carlson, Gaskey & Olds, P.C.

(57) ABSTRACT

A gas turbine engine includes a main compressor section having a downstream most location, and a turbine section, with both the main compressor section and the turbine section housing rotatable components. A first tap taps air compressed by the main compressor section at an upstream location upstream of the downstream most location. The first tap passes through a heat exchanger, and to a cooling compressor. Air downstream of the cooling compressor is selectively connected to reach at least one of the rotatable components. The cooling compressor is connected to rotate at a speed proportional to a rotational speed in one of the main compressor section and the turbine section. A valve system includes a check valve for selectively blocking flow downstream of the cooling compressor from reaching the at least one rotatable component. A dump valve selectively dumps air downstream of the cooling compressor. A method is also disclosed.

20 Claims, 2 Drawing Sheets

(51) Int. Cl.
*F02C 6/08* (2006.01)
*F02C 7/32* (2006.01)
*F02K 3/06* (2006.01)
*F16K 15/14* (2006.01)

(52) U.S. Cl.
CPC ........ *F16K 15/147* (2013.01); *F05D 2220/32* (2013.01); *F05D 2260/213* (2013.01); *F05D 2260/4031* (2013.01)

(58) Field of Classification Search
CPC ...... F02C 7/32; F02C 9/18; F02K 3/06; F16K 15/147
See application file for complete search history.

(56) References Cited

U.S. PATENT DOCUMENTS

| | | | |
|---|---|---|---|
| 4,254,618 | A | 3/1981 | Elovic |
| 4,539,945 | A | 9/1985 | Bosisio |
| 4,882,902 | A | 11/1989 | Reigel et al. |
| 5,056,335 | A | 10/1991 | Renninger et al. |
| 5,269,135 | A | 12/1993 | Vermejan et al. |
| 5,305,616 | A | 4/1994 | Coffinberry |
| 5,317,877 | A | 6/1994 | Stuart |
| 5,392,614 | A | 2/1995 | Coffinberry |
| 5,414,992 | A | 5/1995 | Glickstein |
| 5,452,573 | A | 9/1995 | Glickstein et al. |
| 5,498,126 | A | 3/1996 | Pighetti et al. |
| 5,724,806 | A | 3/1998 | Horner |
| 5,758,485 | A | 6/1998 | Frutschi |
| 5,867,979 | A | 2/1999 | Newton et al. |
| 5,918,458 | A | 7/1999 | Coffinberry et al. |
| 6,050,079 | A | 4/2000 | Durgin et al. |
| 6,065,282 | A | 5/2000 | Fukue et al. |
| 6,134,880 | A | 10/2000 | Yoshinaka |
| 6,253,554 | B1 | 7/2001 | Kobayashi et al. |
| 6,430,931 | B1 | 8/2002 | Horner |
| 6,487,863 | B1 | 12/2002 | Chen et al. |
| 6,612,114 | B1 | 9/2003 | Klingels |
| 6,892,523 | B2 | 5/2005 | Fetescu et al. |
| 7,237,386 | B2 | 7/2007 | Hoffmann et al. |
| 7,246,484 | B2 | 7/2007 | Giffin, III et al. |
| 7,284,377 | B2 | 10/2007 | Joshi et al. |
| 7,306,424 | B2 | 12/2007 | Romanov et al. |
| 7,334,412 | B2 | 2/2008 | Tiemann |
| 7,347,637 | B2 | 3/2008 | Kubo et al. |
| 7,500,365 | B2 | 3/2009 | Suciu et al. |
| 7,552,591 | B2 | 6/2009 | Bart et al. |
| 7,698,884 | B2 | 4/2010 | Maguire et al. |
| 7,765,788 | B2 | 8/2010 | Schwarz |
| 7,823,389 | B2 | 11/2010 | Seitzer et al. |
| 7,882,691 | B2 | 2/2011 | Lemmers, Jr. et al. |
| 7,886,520 | B2 | 2/2011 | Stretton et al. |
| 8,015,828 | B2 | 9/2011 | Moniz et al. |
| 8,037,686 | B2 | 10/2011 | Lasker |
| 8,087,249 | B2 | 1/2012 | Ottaviano et al. |
| 8,181,443 | B2 | 5/2012 | Rago |
| 8,307,626 | B2 * | 11/2012 | Sheridan ................ F01D 25/20 184/29 |
| 8,307,662 | B2 | 11/2012 | Turco |
| 8,350,398 | B2 | 1/2013 | Butt |
| 8,397,487 | B2 | 3/2013 | Sennoun et al. |
| 8,402,742 | B2 | 3/2013 | Roberge et al. |
| 8,434,997 | B2 | 5/2013 | Pinero et al. |
| 8,511,967 | B2 | 8/2013 | Suciu et al. |
| 8,522,529 | B2 | 9/2013 | Martinou et al. |
| 8,572,982 | B2 | 11/2013 | Tiemann |
| 8,602,717 | B2 | 12/2013 | Suciu et al. |
| 8,621,871 | B2 | 1/2014 | McCune et al. |
| 8,727,703 | B2 | 5/2014 | Laurello et al. |
| 8,776,952 | B2 | 7/2014 | Schwarz et al. |
| 8,814,502 | B2 | 8/2014 | Eleftheriou |
| 8,876,465 | B2 | 11/2014 | Stretton |
| 8,961,108 | B2 | 2/2015 | Bergman et al. |
| 9,234,481 | B2 | 1/2016 | Suciu et al. |
| 9,243,563 | B2 | 1/2016 | Lo |
| 9,255,492 | B2 | 2/2016 | Bacic |
| 9,297,391 | B2 | 3/2016 | Rued et al. |
| 9,422,063 | B2 | 8/2016 | Diaz |
| 9,429,072 | B2 | 8/2016 | Diaz et al. |
| 9,856,793 | B2 | 1/2018 | Zelesky et al. |
| 10,054,051 | B2 | 8/2018 | Foutch et al. |
| 11,255,268 | B2 * | 2/2022 | Turney ..................... F02C 6/08 |
| 2001/0022087 | A1 | 9/2001 | Kobayashi et al. |
| 2003/0046938 | A1 | 3/2003 | Mortzheim et al. |
| 2004/0088995 | A1 | 5/2004 | Reissig |
| 2005/0172612 | A1 | 8/2005 | Yamanaka et al. |
| 2007/0022735 | A1 | 2/2007 | Henry et al. |
| 2007/0213917 | A1 | 9/2007 | Bruno et al. |
| 2007/0245738 | A1 | 10/2007 | Stretton et al. |
| 2008/0028763 | A1 | 2/2008 | Schwarz et al. |
| 2008/0230651 | A1 | 9/2008 | Porte |
| 2008/0253881 | A1 | 10/2008 | Richards |
| 2009/0007567 | A1 | 1/2009 | Porte et al. |
| 2009/0090096 | A1 | 4/2009 | Sheridan |
| 2009/0145102 | A1 | 6/2009 | Roberge et al. |
| 2009/0196736 | A1 | 8/2009 | Sengar et al. |
| 2009/0226297 | A1 | 9/2009 | Yanagi et al. |
| 2009/0272120 | A1 | 11/2009 | Tiemann |
| 2010/0043396 | A1 | 2/2010 | Coffinberry |
| 2010/0154434 | A1 | 6/2010 | Kubota et al. |
| 2011/0036066 | A1 | 2/2011 | Zhang et al. |
| 2011/0088405 | A1 | 4/2011 | Turco |
| 2011/0120083 | A1 | 5/2011 | Giffin et al. |
| 2011/0247344 | A1 | 10/2011 | Glahn et al. |
| 2012/0067055 | A1 | 3/2012 | Held |
| 2012/0102915 | A1 | 5/2012 | Baltas |
| 2012/0159961 | A1 | 6/2012 | Krautheim et al. |
| 2012/0180509 | A1 | 7/2012 | DeFrancesco |
| 2013/0036747 | A1 | 2/2013 | Fuchs et al. |
| 2013/0067928 | A1 | 3/2013 | Arias Chao et al. |
| 2013/0098059 | A1 | 4/2013 | Suciu et al. |
| 2013/0145744 | A1 | 6/2013 | Lo et al. |
| 2013/0145774 | A1 | 6/2013 | Duong et al. |
| 2013/0186102 | A1 | 7/2013 | Lo |
| 2013/0199156 | A1 | 8/2013 | Ress, Jr. et al. |
| 2013/0239583 | A1 | 9/2013 | Suciu et al. |
| 2013/0319002 | A1 | 12/2013 | Sidelkovskiy et al. |
| 2014/0020506 | A1 | 1/2014 | Duong |
| 2014/0137417 | A1 | 5/2014 | Silberberg et al. |
| 2014/0196469 | A1 | 7/2014 | Finney et al. |
| 2014/0230444 | A1 | 8/2014 | Hao et al. |
| 2014/0250898 | A1 | 9/2014 | Mackin et al. |
| 2014/0260326 | A1 | 9/2014 | Schwarz et al. |
| 2014/0311157 | A1 | 10/2014 | Laurello et al. |
| 2014/0341704 | A1 | 11/2014 | Fletcher |
| 2014/0352315 | A1 | 12/2014 | Diaz |
| 2015/0114611 | A1 | 4/2015 | Morris et al. |
| 2015/0275758 | A1 | 10/2015 | Foutch et al. |
| 2015/0275769 | A1 | 10/2015 | Foutch et al. |
| 2015/0285147 | A1 | 10/2015 | Phillips et al. |
| 2015/0308339 | A1 | 10/2015 | Forcier |
| 2015/0330236 | A1 | 11/2015 | Beecroft et al. |
| 2015/0354465 | A1 | 12/2015 | Suciu et al. |
| 2015/0354822 | A1 | 12/2015 | Suciu et al. |
| 2016/0009399 | A1 | 1/2016 | Schwarz et al. |
| 2016/0010554 | A1 | 1/2016 | Suciu et al. |
| 2016/0131036 | A1 | 5/2016 | Bintz et al. |
| 2016/0131037 | A1 | 5/2016 | Spangler et al. |
| 2016/0169118 | A1 | 6/2016 | Duong |
| 2016/0215732 | A1 | 7/2016 | Malecki |
| 2016/0237906 | A1 | 8/2016 | Suciu et al. |
| 2016/0312797 | A1 | 10/2016 | Suciu et al. |
| 2016/0341125 | A1 | 11/2016 | Kraft et al. |
| 2016/0369697 | A1 | 12/2016 | Schwarz et al. |
| 2017/0009657 | A1 | 1/2017 | Schwarz et al. |
| 2017/0044980 | A1 | 2/2017 | Duesler et al. |
| 2017/0044982 | A1 | 2/2017 | Duesler et al. |
| 2017/0106985 | A1 | 4/2017 | Stieger et al. |
| 2017/0152765 | A1 | 6/2017 | Uechi et al. |
| 2017/0159568 | A1 | 6/2017 | Sennoun et al. |
| 2017/0167388 | A1 | 6/2017 | Merry et al. |
| 2017/0175632 | A1 | 6/2017 | Hanrahan et al. |

(56) References Cited

U.S. PATENT DOCUMENTS

| | | | |
|---|---|---|---|
| 2017/0184027 A1 | 6/2017 | Moniz et al. | |
| 2017/0204787 A1 | 7/2017 | Duesler et al. | |
| 2018/0156121 A1 | 6/2018 | Snape et al. | |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.
European Search Report for EP Application No. 22200680.1 dated Feb. 8, 2023.

\* cited by examiner

INTERCOOLED COOLING AIR WITH SELECTIVE PRESSURE DUMP

CROSS-REFERENCE TO RELATED APPLICATIONS

This application is a continuation of U.S. patent application Ser. No. 16/050,409 filed on Jul. 31, 2018.

BACKGROUND

This application relates to a control for selectively dumping air downstream of a cooling compressor in an intercooled cooling air system.

Gas turbine engines are known and typically include a fan delivering air into a bypass duct as propulsion air. Air is also delivered into a compressor where it is mixed with fuel and ignited. Products of this combustion pass downstream over turbine rotors, driving them to rotate.

It is known to provide cooling air to several areas within the gas turbine engine. As examples, the downstream portions of the compressor section and the more upstream portions of the turbine section experience high heat loads. Thus, it is known to provide cooling air.

Gas turbine engines have historically driven a low pressure compressor and a fan at a common speed with a single turbine. More recently, it has been proposed to incorporate a gear reduction between the low pressure compressor and the fan. This allows an increase in a bypass ratio, where the portion of air delivered into the bypass duct is propulsion air compared to the air delivered into the compressor. With such a change, the air being delivered into the compressor must be utilized efficiently.

In addition, the overall efficiency of all types of gas turbine engines is becoming an increasingly important matter of design. Fuel prices are rising and, thus, any efficiency improvement is important.

SUMMARY

In a featured embodiment, a gas turbine engine includes a main compressor section having a downstream most location, and a turbine section, with both the main compressor section and the turbine section housing rotatable components. A first tap taps air compressed by the main compressor section at an upstream location upstream of the downstream most location. The first tap passes through a heat exchanger, and to a cooling compressor. Air downstream of the cooling compressor is selectively connected to reach at least one of the rotatable components. The cooling compressor is connected to rotate at a speed proportional to a rotational speed in one of the main compressor section and the turbine section. A valve system includes a check valve for selectively blocking flow downstream of the cooling compressor from reaching the at least one rotatable component. A dump valve selectively dumps air downstream of the cooling compressor.

In another embodiment according to the previous embodiment, the heat exchanger is positioned in a bypass duct, and a fan delivers air into the bypass duct and into the main compressor section.

In another embodiment according to any of the previous embodiments, the cooling compressor is driven by a shaft which rotates with a high pressure turbine.

In another embodiment according to any of the previous embodiments, a take-off shaft is connected to be driven by the shaft and, in turn connected to drive the cooling compressor.

In another embodiment according to any of the previous embodiments, the take-off shaft is connected to drive the cooling compressor through a gearbox.

In another embodiment according to any of the previous embodiments, a second tap is located downstream of the upstream location, and is connected to selectively deliver air to cool the at least one of the rotatable components at least when the check valve blocks flow downstream of the cooling compressor.

In another embodiment according to any of the previous embodiments, the dump valve and the check valve move as a single valve.

In another embodiment according to any of the previous embodiments, the check valve is driven by a pressure downstream of the cooling compressor to allow flow to reach the at least one of the rotatable components when a pressure downstream of the cooling compressor is above a predetermined limit greater than the pressure at the second tap location, and block flow when the pressure downstream of the cooling compressor is below the predetermined limit, and the check valve is connected to a moving valve which selectively opens or blocks communication to dump the air.

In another embodiment according to any of the previous embodiments, the upstream location is in a high pressure compressor.

In another embodiment according to any of the previous embodiments, a second tap is located downstream of the upstream location, and is connected to selectively deliver air to cool the at least one of the rotatable components at least when the check valve blocks flow downstream of the cooling compressor.

In another embodiment according to any of the previous embodiments, the dump valve and the check valve move as a single valve.

In another embodiment according to any of the previous embodiments, the check valve is driven by a pressure downstream of the cooling compressor to allow flow to reach the at least one of the rotatable components when a pressure downstream of the cooling compressor is above a predetermined limit greater than the pressure at the second tap location, and block flow when the pressure downstream of the cooling compressor is below the predetermined limit, and the check valve is connected to a moving valve which selectively opens or blocks communication to dump the air.

In another embodiment according to any of the previous embodiments, dumped air is used to increase air flow across an auxiliary heat exchanger.

In another featured embodiment, a gas turbine engine includes a main compressor section having a downstream most location, and a turbine section, with both the main compressor section and the turbine section housing rotatable components. There is a means for tapping air compressed by the main compressor section at a location upstream of the downstream most location, and cooling the tapped air before passing it to a cooling compressor and selectively connecting the tapped air to reach at least one of the rotatable components. The cooling compressor is connected to rotate at a speed proportional to a rotational speed in one of the main compressor section and the turbine section. There is a means for selectively blocking flow downstream of the cooling compressor from reaching the at least one rotatable component, and selectively dumping air downstream of the cooling compressor.

In another embodiment according to the previous embodiment, the cooling compressor is connected to be driven by a shaft which rotates with a high pressure turbine.

In another embodiment according to any of the previous embodiments, the means for tapping includes a first tap at a location in a high pressure compressor.

In another embodiment according to any of the previous embodiments, a second tap is located downstream of the upstream location, and is connected for selectively deliver air to cool the at least one of the rotatable components at least when the means for selectively blocking blocks flow downstream of the cooling compressor.

In another embodiment according to any of the previous embodiments, means for selectively blocking includes a dump valve and a check valve which move as a single valve.

In another embodiment according to any of the previous embodiments, the dump valve and the check valve move as a single valve.

In another featured embodiment, a method of operating a gas turbine engine includes driving a main compressor section having a downstream most location, and driving a turbine section, with both the main compressor section and the turbine section housing rotatable components. Tapping air is compressed by the main compressor section at a location upstream of the downstream most location, and passes the tapped air through a heat exchanger, and to a cooling compressor. Air downstream of the cooling compressor is selectively connected to reach at least one of the rotatable components. The cooling compressor is driven to rotate at a speed proportional to a rotational speed in one of the main compressor section and the turbine section. The method selectively blocking flow downstream of the cooling compressor from reaching the at least one rotatable component, and selectively dumps air downstream of the cooling compressor.

These and other features may be best understood from the following drawings and specification.

DETAILED DESCRIPTION

Figure 1:
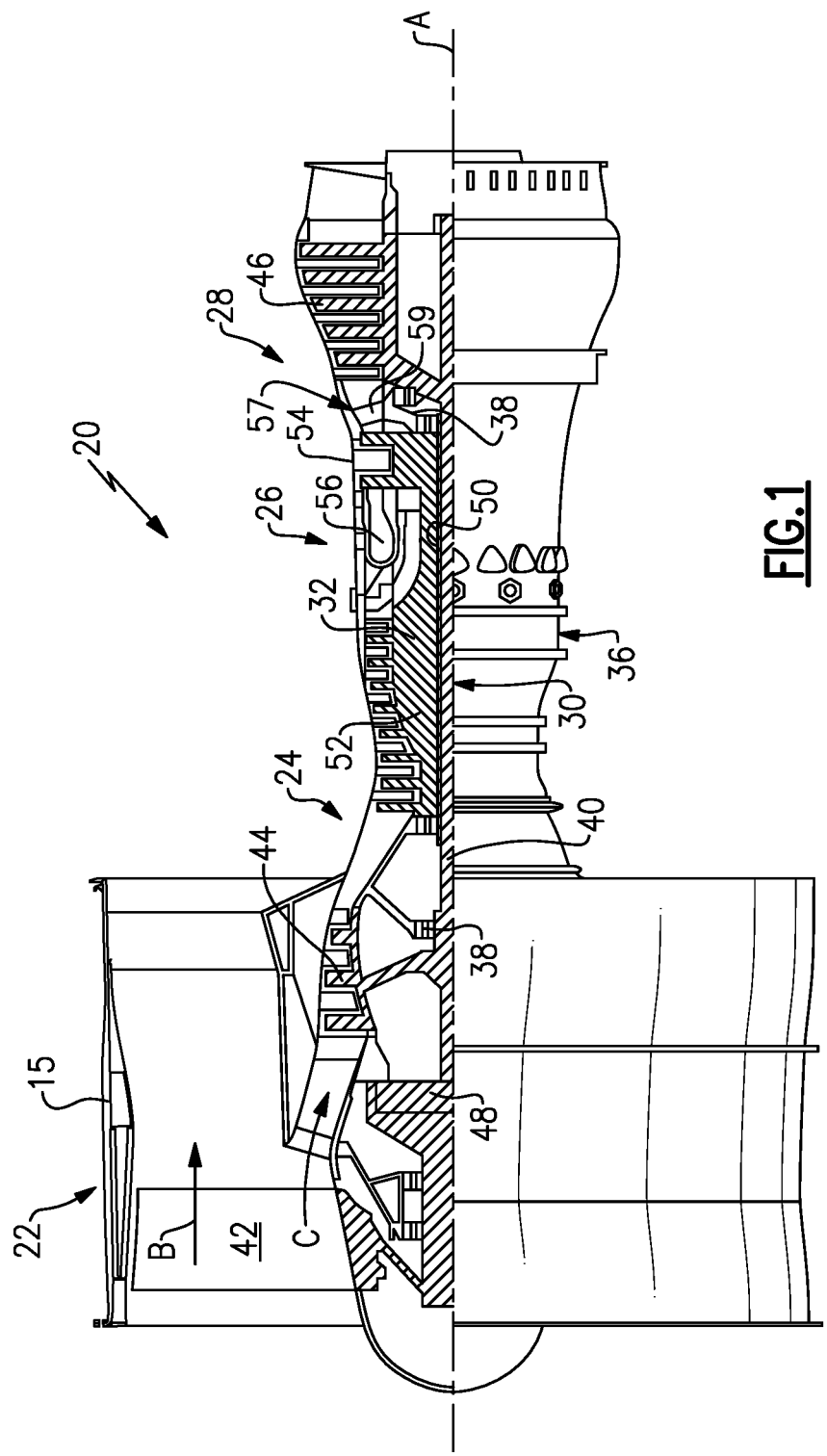
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
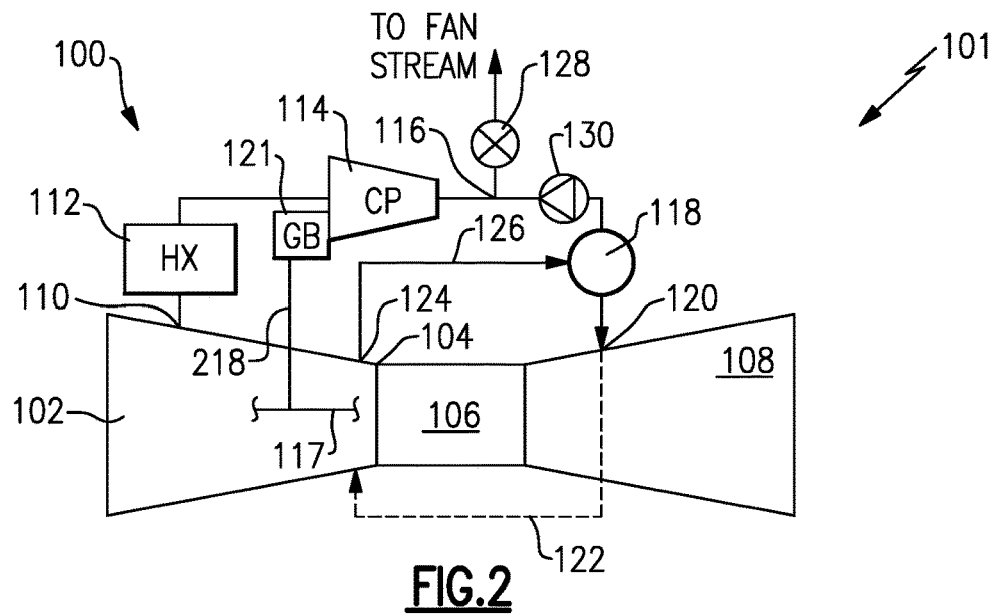
FIG. 2 schematically shows a cooling air system.

FIG. 2 shows an intercooled cooling system 100 for delivering cooling air to rotating components within an engine 101.

The engine 101 includes a main compressor section 102 having a downstream most location 104. A combustor 106 is downstream of a main compressor section 102 and a turbine section 108 is downstream of a combustor 106.

Air is shown being tapped at a location 110 which is upstream of the downstream most location 104. By selectively tapping air at this "less compressed" location, less work is utilized to achieve the air being tapped. The air may be tapped in an upstream portion of a high pressure compressor or even in a low pressure compressor section. Air from the tap 110 passes through a heat exchanger 112. The heat exchanger 112 may be placed in a bypass duct, such as the bypass duct shown in FIG. 1.

Downstream of the heat exchanger 112, the air passes through a cooling compressor 114. Cooling compressor 114 may be a centrifugal compressor. As shown schematically, a shaft 117, which may be driven as part of the high pressure spool (see FIG. 1), drives a take-off shaft 218. Shaft 218 drives a rotor, or impeller, of the centrifugal compressor 114 through a gearbox 121.

Air downstream of compressor 114 communicates to line 116, and then through a mixing chamber 118 into the turbine section 108, as shown at point 120. It should be understood that this is a schematic representation. In fact, the air may often move into the core engine through a downstream vane or strut approximately at the downstream most location 104, and then move radially inwardly of the combustor to reach upstream portions of the turbine section 108. As shown in phantom at line 122, the cooling air can also be delivered to the downstream portions of the compressor section 102.

For purposes of this application, the compressor and turbine sections could be said to have rotatable components and the cooling air is supplied to at least one of the rotating components in the compressor and/or turbine sections 102 and 108.

At times, it may be undesirable to supply air from the tap 110 to the cooling location 120. Thus, a second tap 124, which may be closer to the downstream most location 104, and could even be downstream of the downstream most location 104, is communicated through line 126 to the mixing chamber 118.

The times when it may be less desirable to tap from the location 110 may be lower power operation of the engine 101. Since the compressor 114 is driven at a speed directly proportional to the speed of shaft 117, as the engine moves to slower speed operation, the compressor 114 will also move to slower operation. At such times, a pressure ratio across the compressor may increase such that the compressor may see undesirable operation. As an example, the pressure ratio may approach, and even pass, a surge line, which would be undesirable. Thus, during lower power operation, the air at line 116 may pass through a dump valve 128 and be dumped into an exhaust stream, or into the bypass flow. At the same time, a check valve 130 may block communication downstream of the compressor 114 from reaching the mixing chamber 118 and the inlet 120 to the core engine. At such times, the air from line 126 may pass to provide cooling air.

Figures 3A, 3B:
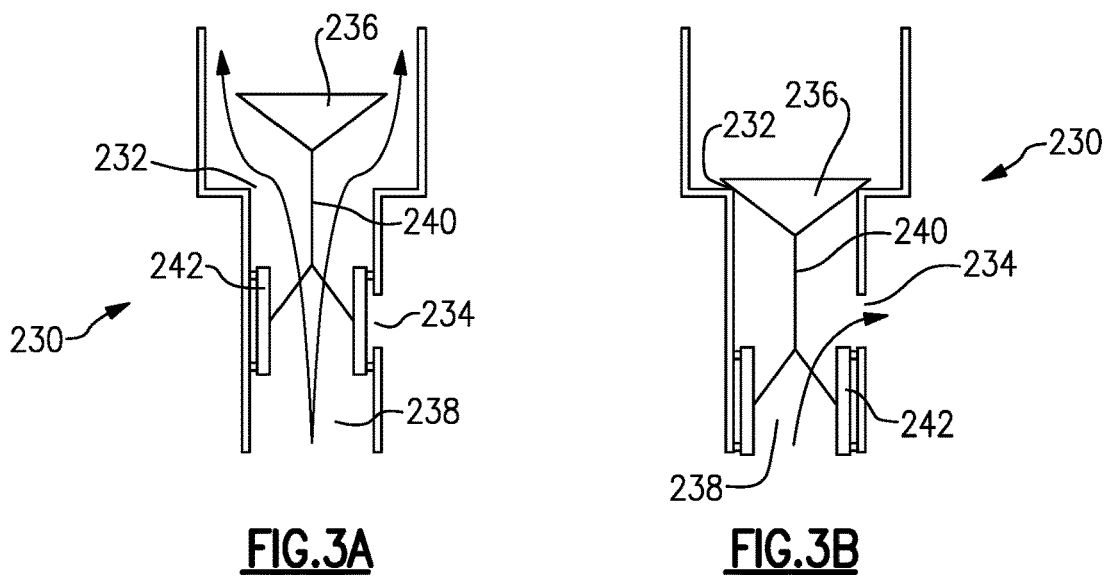
FIG. 3A shows a valve arrangement in a first position.
FIG. 3B shows the FIG. 3A valve in a second position.

FIG. 3A shows a first embodiment of a valve which may provide the function of both valves 128 and 130. The combined valve 230, as shown in FIG. 3A, is shown in a first higher power position at which air is allowed to move through a check valve portion 236, which is removed from a seat 232, such that air can pass to the mixing chamber 118 from a cooling compressor 114. When the air downstream of the cooling compressor 114 is above a predetermined pressure, the valve will be in the FIG. 3A position. More accurately, the valve is open (in the FIG. 3A position) when a pressure difference between lines 116 and 118 exceeds a predetermined level.

As shown, a connection 240 connects the check valve 236 to a dump valve 242, which is shown selectively blocking a vent 234. Pressure in the connection 238, which is downstream of the cooling compressor 114, will maintain the valves 236 and 242 in this position during higher power operation.

Compressor 114 is designed such that the pressure at line 116 is greater than that at line 126. Thus, air will flow to 120 from line 116. In other embodiments air may flow from both lines for cooling purposes in the FIG. 3A position, and only line 126 in the FIG. 3B position.

As an example, the FIG. 3A operation may occur during take-off and other high power operation. However, when the pressure on line 238 decreases, such as would occur, for example, at cruise condition, the valve 234 seats against the seat 232. The connection 240 move the valve such that the vent 234 is opened and air may pass into the bypass duct or otherwise pass into an exhaust stream.

It could be said that the valve combination 230 operates automatically based upon the pressure downstream of the cooling compressor 114 to selectively block flow to the cooling location, while at the same time dumping flow downstream of the cooling compressor.

The check valve is also there to limit or prevent backflow from chamber 118 reaching line 116.

The FIG. 3B operation might occur, for example, at idle or descent conditions.

Figure 4:
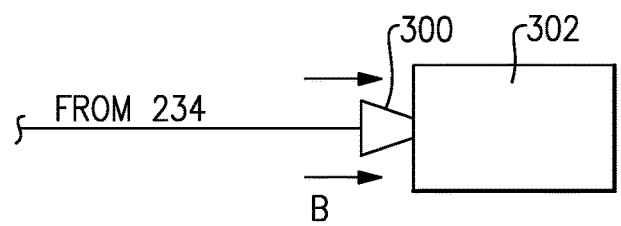
FIG. 4 shows an optional feature.

FIG. 4 shows an optional feature that may use the "dumped" air. Air downstream of valve 234 may pass through an ejector 300 to draw additional bypass air B across a heat exchanger 302. The ejector 300 may also be positioned downstream of heat exchanger 302. Heat exchanger 302 could be cooling any number of fluids associated with the engine.

For purposes of this application this FIG. 4 use, and other uses, are still interpreted as "dumped."

A gas turbine engine could be said to have a main compressor section having a downstream most location, and a turbine section. The main compressor section and the turbine section both housing rotatable components. There is a means for tapping air compressed by the main compressor section at a location upstream of the downstream most location. The means cools the tapped air before passing it to a cooling compressor and selectively connecting to the tapped air reach at least one of the rotatable components.

The cooling compressor in the means for tapping is connected to rotate at a speed proportional to a rotational speed in one of the main compressor section and the turbine section. There is also a means for selectively blocking flow downstream of the cooling compressor from reaching the at least one rotatable component, and selectively dumping air downstream of the cooling compressor.

The means for tapping includes a first tap at a location in a high pressure compressor. The means for selectively blocking includes a dump valve and a check valve which move as a single valve.

A method of operating a gas turbine engine could be said to include the steps of driving a main compressor section having a downstream most location, and driving a turbine section, with both the main compressor section and the turbine section housing rotatable components. Tapped air is compressed by the main compressor section at a location upstream of the downstream most location. The tapped air is passed through a heat exchanger, and to a cooling compressor. Air downstream of the cooling compressor is selectively connected to reach at least one of the rotatable components. The cooling compressor is driven to rotate at a speed proportional to a rotational speed in one of the main compressor section and the turbine section. The method selectively dumps air downstream of the cooling compressor and at the same time blocks flow downstream of the cooling compressor.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a main compressor section and a turbine section, with both said main compressor section and said turbine section including rotatable components;
a first tap for tapping air compressed by said main compressor section, and said first tap passing through a heat exchanger, and to a cooling compressor, air downstream of said cooling compressor being selectively connected to reach at least one of said rotatable components, and said cooling compressor being connected to rotate at a speed proportional to a rotational speed in one of said main compressor section and said turbine section;
a valve system including a check valve for selectively blocking flow downstream of said cooling compressor from reaching said at least one rotatable component, and a dump valve for selectively dumping air downstream of said cooling compressor; and
said at least one of said rotatable components being in said turbine section, and said dump valve acting to dump air downstream of said cooling compressor, but upstream of said turbine section such that air dumped by said dump valve does not reach said at least one of said rotatable components in said turbine section.

2. The gas turbine engine as set forth in claim 1, wherein said heat exchanger is positioned in a bypass duct, and a fan delivering air into said bypass duct and into said main compressor section.

3. The gas turbine engine as set forth in claim 1, wherein said cooling compressor is driven by a shaft which rotates with a high pressure turbine.

4. The gas turbine engine as set forth in claim 3, wherein a take-off shaft is connected to be driven by said shaft and, in turn connected to drive said cooling compressor.

5. The gas turbine engine as set forth in claim 3, wherein a second tap is located downstream of said upstream location, and is connected to selectively deliver air to cool said at least one of said rotatable components at least when said check valve blocks flow downstream of said cooling compressor.

6. The gas turbine engine as set forth in claim 1, wherein a second tap is located downstream of said upstream location, and is connected to selectively deliver air to cool said at least one of said rotatable components at least when said check valve blocks flow downstream of said cooling compressor.

7. The gas turbine engine as set forth in claim 1, wherein said dump valve and said check valve move as a single valve.

8. The gas turbine engine as set forth in claim 7, wherein said check valve is driven by a pressure downstream of said cooling compressor to allow flow to reach said at least one of said rotatable components when a pressure downstream of said cooling compressor is above a predetermined limit greater than the pressure at the second tap location, and block flow when said pressure downstream of said cooling compressor is below said predetermined limit, and said check valve being connected to a moving valve which selectively opens or blocks communication to dump said air.

9. The gas turbine engine as set forth in claim 8, wherein the dumped air flows across an auxiliary heat exchanger.

10. The gas turbine engine as set forth in claim 1, wherein the dumped air flows across an auxiliary heat exchanger.

11. A gas turbine engine comprising:
a main compressor section having a downstream most location, and a turbine section, with both said main compressor section and said turbine section including rotatable components;
a first tap for tapping air compressed by said main compressor section at an upstream location upstream of said downstream most location, and said tapped air passing through a heat exchanger, and to a cooling compressor, air downstream of said cooling compressor being selectively connected to reach at least one of said rotatable components;
a valve system including a check valve for selectively blocking flow downstream of said cooling compressor from reaching said at least one rotatable component, and a dump valve for selectively dumping air downstream of said cooling compressor;
wherein said dump valve and said check valve move as a single valve in response to a common pressure source; and
wherein said check valve is driven by a pressure downstream of said cooling compressor to allow flow to reach said at least one of said rotatable components when a pressure downstream of said cooling compressor is above a predetermined limit greater than the pressure at a second tap location, the second tap location being downstream of said upstream location, and block flow when said pressure downstream of said cooling compressor is below said predetermined limit, and said check valve being connected to a moving valve which selectively opens or blocks communication to dump said air.

12. The gas turbine engine as set forth in claim 11, wherein said heat exchanger is positioned in a bypass duct, and a fan delivering air into said bypass duct and into said main compressor section.

13. The gas turbine engine as set forth in claim 11, wherein said cooling compressor is driven by a shaft which rotates with a high pressure turbine.

14. The gas turbine engine as set forth in claim 13, wherein a take-off shaft is connected to be driven by said shaft and, in turn connected to drive said cooling compressor.

15. The gas turbine engine as set forth in claim 14, wherein said take-off shaft is connected to drive said cooling compressor through a gearbox.

16. The gas turbine engine as set forth in claim 13, wherein a second tap is located downstream of said upstream location, and is connected to selectively deliver air to cool said at least one of said rotatable components at least when said check valve blocks flow downstream of said cooling compressor.

17. The gas turbine engine as set forth in claim 11, wherein a second tap is located downstream of said upstream location, and is connected to selectively deliver air to cool said at least one of said rotatable components at least when said check valve blocks flow downstream of said cooling compressor.

18. The gas turbine engine as set forth in claim 11, wherein said upstream location is in a high pressure compressor.

19. The gas turbine engine as set forth in claim 11, wherein the dumped air flows across an auxiliary heat exchanger.

20. A method of operating a gas turbine engine comprising: driving a main compressor section having a downstream most location, and driving a turbine section, with both said main compressor section and said turbine section including rotatable components; tapping air compressed by said main compressor section at a location upstream of said downstream most location, and passing the tapped air through a heat exchanger, and to a cooling compressor, air downstream of said cooling compressor being selectively connected to reach at least one of said rotatable components; selectively blocking flow downstream of said cooling compressor from reaching said at least one rotatable component, and selectively dumping air downstream of said cooling compressor; and said at least one of said rotatable components being in said turbine section, and a dump valve acting to dump air downstream of said cooling compressor, but upstream of said turbine section such that air dumped by said dump valve does not reach said at least one of said rotatable components in said turbine section.

\* \* \* \* \*